United States Patent [19]

Sobajima

[11] 3,738,160

[45] June 12, 1973

[54] HIGH-TEMPERATURE HARDNESS METER PROVIDED WITH A DEVICE FOR MOVING A SAMPLE OBJECT

[75] Inventor: Masaru Sobajima, Meguro-ku, Tokyo, Japan

[73] Assignee: Nippon Kogaku K. K., Tokyo, Japan

[22] Filed: Dec. 16, 1971

[21] Appl. No.: 208,649

[30] Foreign Application Priority Data
Dec. 24, 1970  Japan............................. 45/116647

[52] U.S. Cl. .................................................. 73/81
[51] Int. Cl. ............................................ G01n 3/48
[58] Field of Search ................. 73/81, 78, 82, 15.4; 350/81

[56] References Cited
FOREIGN PATENTS OR APPLICATIONS

| | | | |
|---|---|---|---|
| 1,214,865 | 12/1970 | Great Britain.......................... | 73/81 |
| 1,214,866 | 12/1970 | Great Britain.......................... | 73/81 |
| 159,052 | 11/1962 | U.S.S.R............................... | 73/15.4 |

*Primary Examiner*—Richard C. Queisser
*Assistant Examiner*—Stephen A. Kreitman
*Attorney*—Joseph M. Fitzpatrick, John Thomas Cella, Charles B. Cannon

[57] ABSTRACT

A high-temperature hardness meter includes a microscope and pressure means mounted on top of a hermetically sealed housing, the pressure means including a pressing member. The optical axis of the microscope is vertical and the axis of the pressing member is parallel to the optical axis of the microscope. The lower wall of the housing is formed with an opening extending downwardly and having its axis equidistant from the axes of the microscope and pressing member. A rotatable bed is disposed below the opening for rotation about the axis thereof. Movable means is mounted on the rotatable bed for movement with respect to the bed in two horizontal directions orthogonal to each other and perpendicular to the axis of the opening. Gas tight sealing means is interposed between the movable means and the housing portion adjacent to the opening. The movable means is also rotatable about the axis of the opening. An anvil for holding the sample object is fixed to the movable means and extends to a height just beneath the microscope. The opening, the rotatable bed, the movable means, the sealing means and the anvil together constitute a device for moving the sample object.

4 Claims, 2 Drawing Figures

HIGH-TEMPERATURE HARDNESS METER PROVIDED WITH A DEVICE FOR MOVING A SAMPLE OBJECT

BACKGROUND OF THE INVENTION

1. Field of the Invention

This invention relates to a high-temperature hardness meter wherein a sample object is heated in predetermined conditions, such as in a vacuum or in nonoxidizing gases and such heated sample object may then be cooled rapidly without its test surface being oxidized; or a sample object having its surface subjected to various heat treatments in nitriding gas, carburizing gas or the like may be microscopically observed as to the changes in its organization at high temperatures or room temperatures while same may be shifted to determine a required point on the test surface of the sample object. At any desired point of time, and at any desired temperature, a recess or impression may be formed at that required point of the test surface by a predetermined load and thus the size of the recess or impression may be microscopically measured on the spot without the need to change the temperature of the sample object and atmosphere therearound thereby to determine the hardness of the sample object. More particularly, the present invention relates to a device for moving the sample object in the described hardness meter.

2. Description of the Prior Art

In order to move a hot object in a hermetically sealed chamber by extraneous operation, use has generally been made of several O-rings and flexible tubes whose resiliency tends to destroy the physical stability or rigidity of the object and accordingly to reduce the accuracy of the resulting measurement. In some cases where slidable members are disposed in the hermetically sealed chamber, these slidable members are subject to thermal expansion, especially in a vacuum environment, and this has again made it difficult to attain high accuracy of measurement.

SUMMARY OF THE INVENTION

To eliminate the foregoing difficulties and disadvantages, the present invention employs only one O-ring disposed in such a manner that its resiliency imparts a force in the same direction as the load of a sample object placed on the moving device so as not to destroy the rigid posture of the sample object, and slidable members and rotatable members are disposed outside the hermetically sealed chamber to protect them against any thermal influence.

According to the present invention, the high-temperature hardness meter for observing therethrough the surface organization of a sample object at any desired temperature in any desired atmosphere, and for measuring the hardness of the sample object comprises hermetically sealed housing means, a microscope mounted on top of the housing means with its optical axis disposed vertically, pressure means having a pressing member therein and mounted on top of the housing means with the axis of the pressing member disposed remotely from and parallel to the optical axis of the microscope, and a device for moving the sample object. The device includes an opening formed through the lower wall of the hermetically sealed housing means and extending downwardly outwardly therefrom. The opening has its axis equidistant from the optical axis of the microscope and the axis of the pressing member. A rotatable bed is disposed below the opening and is rotatable about the axis of the opening. Movable means are mounted on the rotatable bed by means of a sliding mechanism such as a combination of dovetail grooving or balls and race. The movable means is movable with respect to the rotatable bed in two horizontal directions orthogonal to each other and perpendicular to the axis of the opening. Sealing means, preferably in the form of an O-ring is interposed between the uppermost surface of the movable means and the lower wall of the housing means formed with the opening so as to maintain a gas-tight seal therebetween. The movable means is rotatable about the axis of the opening in addition to being movable in the two horizontal orthogonal directions. An anvil for holding the sample object thereon is fixed to the movable means and extends to a height just beneath the microscope.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as to not depart from the spirit and scope of the invention.

BRIEF DESCRIPTION OF THE DRAWINGS

A specific embodiment of the invention has been chosen for purposes of illustration and description, and is shown in the accompanying drawings forming a part of the specification, wherein.

DESCRIPTION OF THE PREFERRED EMBODIMENTS

Figure 1:
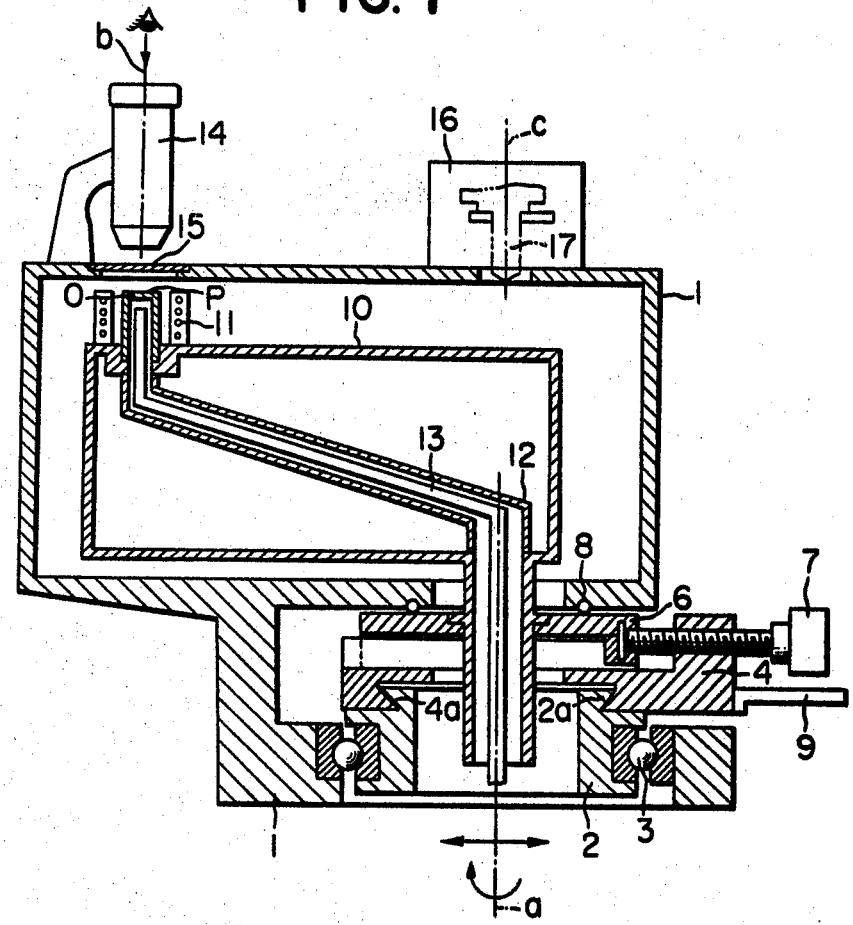
FIG. 1 is a front elevational cross-section of the hardness meter according to an embodiment of the present invention.

Referring to the drawings, the hardness meter embodying the present invention comprises a housing 1 whose interior is hermetically sealed from the exterior and may be evacuated by a vacuum pump (not shown) and then filled with desired gas to provide a predetermined gaseous atmosphere. A rotatable bed 2 is attached to the housing 1 therebelow by means of bearing 3 in such a manner that it is rotatable through approximately 90° about a center axis $a$. Although not shown, two stop members are provided to limit the rotation of the rotatable bed 2. A movable member 4 is mounted for sliding movement relative to the bed 2 in a direction Y (FIG. 2) with the aid of the engagement between a dovetail 2a and a dovetail groove 4a. A knob 5 is provided which may be rotated to move the movable member 4 via a lead screw mechanism (not shown). Another movable member 6 is provided for movement in a direction X (FIG. 2) with respect to the movable member 4 upon rotation of a knob 7. An O-ring 8 is interposed between the housing 1 and the movable member 6 and centered with respect to the center axis $a$. The movable member 6 is free to slide horizontally with respect to the O-ring 8. The O-ring 8 serves to maintain a gas-tight seal for the interior of the housing 1. A lever 9 is provided to rotate the members 2, 4, 5, 6 and 7 with respect to the housing 1 about the center axis $a$.

An anvil 10 for holding a sample object O and a heating furnace 11 therefor is disposed within the housing 1 and fixed to the movable member 6, while maintaining a gas-tight seal for the interior of the housing 1. The sample object O may be movable, with the movable member 6, to any desired horizontal position by rotating the knobs 5 and 7. The sample object O is in the form of a tube closed at one end. The closed end of the sample object O is positioned to face upwardly and provides a test surface; and the open end is fixed to the anvil 10 to maintain a gas-tight seal between the interior and the exterior of the sample object O. A drain pipe 12 extends obliquely within the housing 1 to connect the interior of the sample object O to the exterior of the hermetically sealed chamber defined by the housing 1, and a water supply pipe 13 in turn extends within the drain pipe 12 so that coolant, such as water, may be supplied and ejected through the supply pipe 13 against the inner wall of the sample object O and then drained through the drain pipe 12, thereby enabling the sample object O to be rapidly cooled without the atmosphere over the test surface being changed. If the coolant is liquid nitrogen or the like, the shown arrangement may be utilized as a low-temperature microscope and hardness meter.

A microscope 14 is fixedly mounted on top of the housing 1 so that the test surface of the sample object O may be observed along the optical axis $b$ of the microscope through a viewing window 15 formed in the upper wall of the housing 1. Also mounted on top of the housing 1 but remote from the microscope 14 is a mechanism 16 for vertically moving a pressing member 17 along an axis C and adjusting the load applied to the pressing member.

Figure 2:
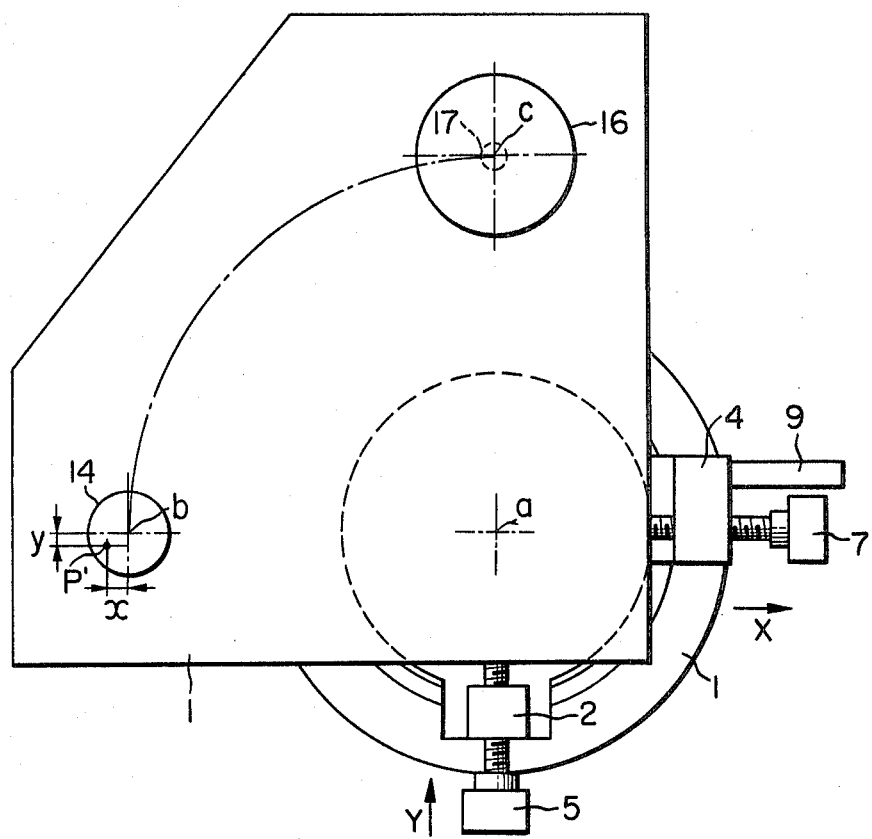
FIG. 2 is a plan view thereof.

The axes $a$, $b$, $c$, the distance between the axis $a$ and the center point P of the test surface, and the two stop members provided between the housing 1 and the rotatable bed 2 are in such positional relationship as will be described hereunder with reference to FIG. 2. By selecting the position of the microscope 14 so that its optical axis $b$ is aligned with the center point P of the test surface when the sample object O has come to the mid-point of its stroke determined by the rotation of knobs 5 and 7 while the housing 1 and rotatable bed 2 are fixed by one of the two stop members. It is possible to observe the entire or maximum area of the test surface through the microscope. The axis $c$ is selected to lie on the circular locus followed by the center point P of the test surface when the sample object O is moved around the axis $a$, and the angle formed between the axes $b$ and $c$ is coincident with the angle formed by the two stop members provided between the housing 1 and the rotatable bed 2. By doing so, it is ensured that irrespective of any position into which the sample object is brought by the rotation of knobs 5 and 7, the test surface lying on the optical axis or at the center of the field of the microscope 14 can come into coincidence with the axis $c$ when the lever 9 is rotated to the position of the other stop member.

Operation of the above-described embodiment will now be described. When the sample object is heated to a predetermined temperature in a predetermined atmosphere and it is desired to observe the test surface as at a point P' in FIG. 2, and to measure the hardness thereof at such point, the knobs 5 and 7 are rotated to move the sample object O by distances $x$ and $y$ in the directions of arrows X and Y until the point P' is seen to come into coincidence with the optical axis $b$ of the microscope 14. Subsequently, the lever 9 is rotated about 90° until stopped by one of the stop members, whereafter the pressing member 17 is lowered to form a recess or impression in the sample object and then the pressing member is raised. The lever 9 is rotated in the opposite direction to return to the initial stop position, whereupon the recess or impression formed in the sample object O can be viewed on the optical axis of the microscope 14 and thus, the hardness of the sample object at that point can be measured.

According to the present invention, any desired point on the test surface can be readily brought into the field of the microscope 14 simply by rotating the two knobs 5 and 7. Moreover, when it is desired to measure the hardness of the test surface at any point thereof in the vicinity of the optical axis of the microscope, this can simply be accomplished by rotating the lever 9 until stopped by one of the stop members, thereupon lowering the pressing member 17 to form an impression at the point of the sample object to be measured, and again raising it and rotating the lever 9 back to its initial position, whereby the same field of view as that prior to the rotation of the lever 9 is obtained to enable the impression formed in the sample object to appear on the optical axis of the microscope 14.

Further, the fact that the slidable and rotatable members, except the O-ring, are all disposed remotely from the sample object and outside the hermetically sealed chamber is useful to protect these members against any adverse effect of heat and/or vacuum atmosphere. Furthermore, this construction permits oil lubrications, and accordingly simplifies the manufacture and maintenance of the moving mechanism. Moreover, only one O-ring is used and only one initial supply of vacuum grease to the O-ring through the clearances formed by members 1, 6, 8, 10 is sufficient to maintain smooth relative movability and gas-tight seal therebetween for a very long period of time without the need for any further supply of such grease.

In the illustrated embodiment of the moving device according to the present invention, the rotatable bed 2 and movable members 4 and 6 are formed with a through-opening substantially concentric with the axis $a$ so as to provide a hollow passage leading to the interior of the cylindrical sample object O supported on the anvil 10. Such a hollow passage readily permits the provision of an additional mechanism for supplying liquid or gas into the interior of the sample object independently of the atmosphere within the hermetically sealed chamber to enable the sample object to be cooled rapidly or cooled to an extremely low temperature.

Although the angular rotation of the rotatable bed 2 has been shown as an angle of 90°, it will be apparent to those skilled in the art that any other suitable angle may be available to form a recess or impression in the sample object and bring it into coincidence with the center of the field of microscope.

I believe that the construction and operation of my novel hardness meter will now be understood, and that its advantages will be fully appreciated by those persons skilled in the art.

I claim:

1. Apparatus of the class described for observing the surface organization of a sample object at any desired temperature in any desired atmosphere and measuring the hardness of the sample object, said hardness meter including hermetically sealed housing means, a microscope mounted on top of said housing means, pressure means having a pressing member therein and mounted on top of said housing means with the axis of said pressing member disposed remotely from and parallel to the optical axis of said microscope, and a device for moving the sample object, said device comprising:

means forming an opening through a wall of said hermetically sealed housing means and extending outwardly therefrom, said opening having its axis equidistant from the optical axis of said microscope and the axis of said pressing member;

a rotatable bed disposed adjacent said opening outside of said housing and rotatable about the axis of said opening;

support means mounted on said rotatable bed;

means permitting movement of said support means with respect to said rotatable bed in two directions and perpendicular to said axis of said opening;

sealing means interposed between the adjacent surfaces of said support means and said housing means formed with said opening to maintain a gas-tight seal therebetween;

said support means being rotatable about said axis of said opening in addition to being movable in said two directions; and an anvil for holding the sample object thereon fixed to said support means, said anvil extending to a height in said housing adjacent said microscope when in one position of rotation and adjacent said pressing means when in another position of rotation.

2. Apparatus as defined in claim 1, wherein said movable means comprises a first movable member mounted on said rotatable bed by means of a dovetail and a dovetail groove for movement with respect to said rotatable bed in a first horizontal direction perpendicular to the axis of said opening, and a second movable member mounted in overlying relationship with said first movable member and for movement with respect thereto in a second horizontal direction orthogonal to said first horizontal direction.

3. A high-temperature hardness meter as defined in claim 1, wherein said rotatable bed is rotatable through any desired angle about the axis of said opening.

4. A high-temperature hardness meter as defined in claim 1, wherein said rotatable bed is rotatable through 90° about the axis of said opening.

* * * * *